Figure 1:
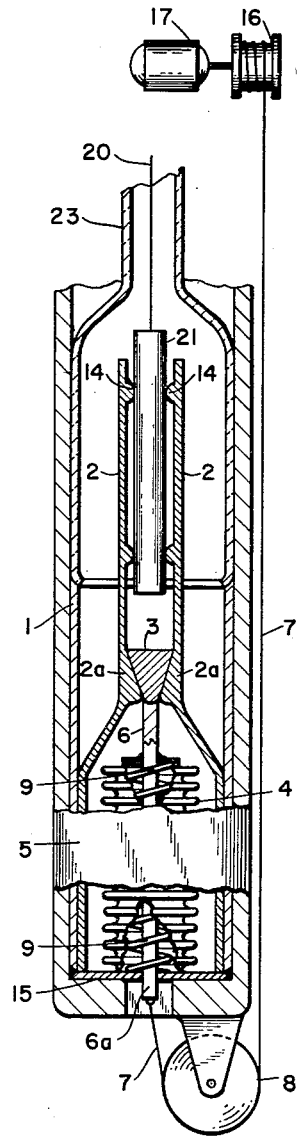

Sept. 20, 1960  R. R. GOODELL  2,953,023
GRAVITY METER CLAMP
Filed July 26, 1957

INVENTOR:
RICHARD R. GOODELL
BY: J. H. McCarthy
HIS AGENT

United States Patent Office 2,953,023
Patented Sept. 20, 1960

2,953,023
GRAVITY METER CLAMP

Richard R. Goodell, Houston, Tex., assignor to Shell Oil Company, New York, N.Y., a corporation of Delaware Filed July 26, 1957, Ser. No. 674,384

1 Claim. (Cl. 73—382)

This invention relates to gravity meters such, for example, as used for purposes of geophysical exploration, and pertains more particularly to a remotely controlled clamping device for use on gravity meters of this type. The present invention provides an improvement in the vibrating-string gravity meter of the type described in U.S. Patent No. 2,657,581.

Since the frequency of transverse vibrations of a string of a given length is proportional to the square root of the tension force applied thereto, gravitational forces can be measured by suspending a mass on a string and determining the tension force exerted by said mass on said string in a given gravitational field by accurately measuring the natural frequency of vibration of the system by the apparatus shown in U.S. Patent 2,657,581. The main components of the apparatus are a mass and a string upon which it is suspended. In order to reduce the air-damping of the vibrations of the string, the string and mass are mounted within an evacuated chamber. The mass is vertically suspended so that the undisturbed pull of gravity on the mass is substantially the only tensioning force applied to the string.

Experience has shown that while gravity meters of this type are capable of producing valuable information, they are susceptible to changes caused by a wide variety of instrument movements which are difficult to avoid in handling gravity meters during surveying operations. Any change in the characteristics of the physical components of a gravity meter results in instrument errors and hence errors in the data obtained from the instrument.

When a gravity meter is placed in an upright position, so that the mass is vertically suspended, the full weight of the mass acts upon the string. In order to obtain the maximum sensitivity a string is of the minimum diameter required to provide a support for the mass without exceeding the elastic limits of the material of which the string is made. In practice, it is impossible to avoid subjecting the string holding the suspended mass to vertical and rotational forces greater than normal when the gravity meter is moved to a measuring location, such, for example, as the interior of a well borehole. Even though the major portion of such forces are absorbed by shock-absorbing mountings supporting the evacuated chamber that contains the suspended mass, the forces applied to the string are often sufficient to alter the measuring characteristics of the instrument.

It is therefore a primary object of the present invention to provide remotely-controlled means for gripping and releasing a vertically suspended mass of a gravity meter, which gripping means does not itself impart damaging stresses to the delicate mass-suspending string of the meter.

A further object of this invention is to provide a remotely controlled clamping means for gripping and releasing a mass which is vertically suspended within an evacuated chamber.

Figure 2:
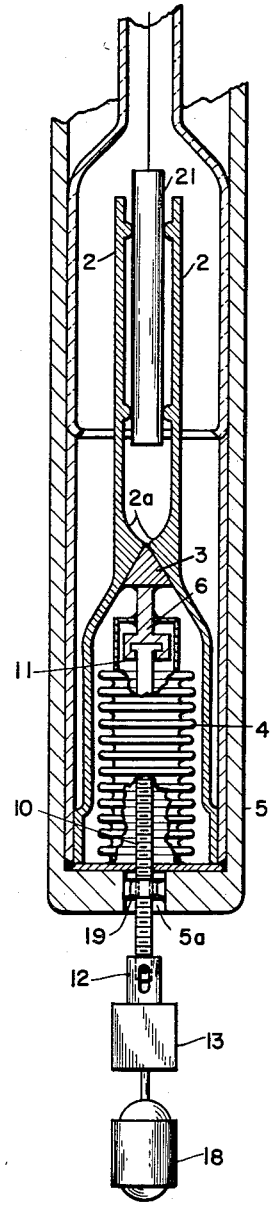

These and other objects of the present invention will appear from the following description taken with reference to the appended drawings wherein:

Figures 1 and 2 are longitudinal views taken in cross-section of clamping means according to the present invention positioned adjacent the suspended weight of a gravity meter.

Referring to Figure 1 of the drawing, the present weight-clamping means is shown mounted on the bottom of a gravity meter similar to the one described in U.S. Patent No. 2,657,581. The lower portion of the gravity meter is shown as containing a mass or weight 21, which is, for example, of the order of 5 grams, and is suspended on a string or wire 20 having a small cross-section and a very small coefficient of thermal expansion. The suspended mass system is enclosed in a container such as an elongated tube 23 which is preferably made of a material such as glass and is evacuated to a high degree of vacuum to decrease the damping of the wire by air friction.

The tube 23 is sealed in a pressure-tight manner to a cylinder 1, which is preferably metallic, so as to provide a housing below the mass 21 to which additional elements are conveniently joined to become a part of the wall of the evacuated chamber. This housing 1, or any part of the evacuated chamber 23, can be constructed of any material having suitable properties of electrical conductivity while at the same time being impermeable to gas and adapted to form a gas-tight union with other materials.

Mounted within the housing 1 and within the lower portion of tube 23 are weight-clamping means which comprise at least two mass-gripping members or fingers 2 which are positioned coaxially within the tube 23 at the level of the mass or weight 21 and on either side thereof. If desired, one or more inwardly-directed contact points 14 may be secured to the inner surface of each of the clamping fingers 2. The gripping members 2 are preferably metallic and are shaped in a manner such that in their inoperative position, i.e., when no force is being applied to them, they are urged into resilient contact with the mass 21. The spacing between adjacent contact points 14 of the gripping fingers 2 is preferably such that the contact points 14 make a very light contact with the outer surface of the mass 21. The lower ends of the gripping members 2 extend downwardly and are fixedly secured to the inner surface of the housing 1.

Suitable means for actuating the gripping fingers or elements 2 are provided which comprise a wedge element 3 coaxially positioned between the gripping fingers 2 and mounted for sliding axial movement whereby the sloping faces of the wedge 3 contact and cooperate with similar sloping bearing surfaces 2a formed on the inner side of the gripping fingers 2 below the mass 21.

The wedge 3 is moved by a force being applied to it through a rod 6 which is fixedly secured to the apex of the wedge at one end, while the other end of the rod is fixedly secured in a fluid-tight manner to diaphragm means, such as a metallic bellows 4 which forms a linearly-moveable sealing means about said rod. The lower end of the bellows 4 may be provided with a flange 15 or any other suitable means by which the bellows may be sealed in gas-tight contact with the bottom of the evacuated housing 1. Sealing of the members may be accomplished by use of a gas-tight soldered union between the lower ends of the bellows 4 and metal cylinder housing 1 which in turn is sealed to the lower end of the tube 23. The wedge-actuating rod 6 either extends through the bellows 4 in a fluid-tight manner or in a second rod 6a is coaxially mounted within the bellows 4 and fixedly secured to the end thereof, as illustrated in Figure 1, to form an extension of rod 6, The bellows unit 4 forms moveable sealing means permitting linear motion to be imparted to the actuating wedge 3. The moveable sealing bellows 4 may be made of any material adapted to be mounted in and secured to the walls of an evacuated chamber so as to provide a gas tight-wall section capable of undergoing a relatively smooth linear motion in relation to the remainder of the chamber.

A remotely-controlled driving means is mounted outside the evacuated chamber and arranged to impart linear or axial motion to the rods 6 and 6a which extend through the moveable sealing bellows 4. In the arrangement shown in Figure 1 of the drawing, a cable 7 is secured at the lower end of the rod 6a and is fed over a sheave 8 which in turn is fixedly mounted on a cage 5 fitted around and secured to the lower end of the gravity meter assembly. Cable 7 leads to any suitable cable reel 16 adapted to be actuated by a reversible-motor driving assembly 17 mounted in any convenient location outside the evacuated system of the gravity meter but preferably within the entire casing (not shown) of the gravity meter. If desired, a spring 9 may be mounted within the bellows 4 if needed to insure proper return of the bellows 4 to its normal expanded position, in which position the fingers 2 grip and prevent movement of the mass 21.

Alternatively, as illustrated in Figure 2 of the drawing, the bearing surfaces 2a on the fingers 2 may face downwardly, rather than upwardly, with the wedge 3 being positioned below the bearing faces 2a. In the embodiment of Figure 2 the wedge 3 is urged upwardly to open the gripping fingers 2 rather than downwardly as in the arrangement of Figure 1. Additionally, the driving mechanism for moving the wedge 3 is modified and comprises a lead screw 10 having one end rotatably mounted in the thrust bearing 11 which in turn is fixedly secured to the lower end of the rod 6 attached to the wedge 3, said rod 6 extending through the bellows 4. The other end of the lead screw 10 is driven by suitable gearing or through a slidable drive connection 12 which in turn is actuated through speed reducer 13 by a reversible motor 18. A lead-screw nut 19 is fixedly secured in an opening 5a in the bottom of cage 5. This opening is sealed in a gas-tight manner from the rest of the evacuated system by the bellows 4 in a manner similar to that described with regard to Figure 1. The motor driving means illustrated in Figure 2 provides means for applying a smooth forward and reverse thrust which can be remotely controlled to apply increased force when needed to overcome inertia or friction.

In employing either of the arrangements shown in Figures 1 or 2 during actual surveying operations, the gripping fingers 2 of the clamping assembly apply equal pressure to both sides of the suspended mass 21 as the gravity meter is being transported or run into a well. With the gravity meter in its predetermined position within the well, the driving means is remotely actuated by suitable circuit means so as to operate motor 17 or 18 which in turn moves wedge 3 against the sloping faces of the gripping fingers 2 and causes the fingers to move apart a predetermined distance and stay apart throughout the period during which readings are taken on the gravity meter. After the gravity meter survey is finished, the motors 17 or 18 are again actuated to return the wedge 3 to its previous position, thus allowing the fingers 2 to grip the suspended mass 21 again.

I claim as my invention:

A gravity meter comprising a string, a mass suspended thereon, a tube forming an evacuated chamber about the said suspended mass, bellows means closing the lower end of said tube in a gas-tight manner, at least two moveable coaxial mass gripping members normally positioned in contact with said mass over a substantial area on at least two sides thereof to prevent any movement of said mass, wedge means mounted below said mass and in contact with a portion of said gripping members for moving said gripping members substantially horizontally from said mass to permit movement thereof, rod means fixedly secured to said wedge means and extending through said bellows means, said rod means mounted for movement with said bellows means for positioning said wedge means, a cable secured to the rod means outside said bellows means for actuating said rod means, a cable reel positioned adjacent said tube for reeling said cable, and remotely controlled motor means operatively connected to said cable reel for rotating said cable reel.

References Cited in the file of this patent

UNITED STATES PATENTS

| 2,097,156 | Holweck | Oct. 26, 1937 |
| 2,556,253 | Blair et al. | June 12, 1951 |
| 2,560,366 | Owen | July 10, 1951 |
| 2,657,581 | Fay et al. | Nov. 3, 1953 |

FOREIGN PATENTS

| 746,854 | Germany | Dec. 27, 1944 |

OTHER REFERENCES

Article by Holweck et al. in the publication (France) "Academie des Sciences," May 4, 1931, pages 1116–1119.